(12) United States Patent
Graaf et al.

(10) Patent No.: US 10,279,655 B2
(45) Date of Patent: May 7, 2019

(54) HV ICOOL LIGHT HVAC

(71) Applicant: Hanon Systems, Daejeon (KR)

(72) Inventors: Marc Graaf, Krefeld (DE); Gerald Richter, Aachen (DE)

(73) Assignee: HANON SYSTEMS, Daejeon (KR)

( * ) Notice: Subject to any disclaimer, the term of this patent is extended or adjusted under 35 U.S.C. 154(b) by 212 days.

(21) Appl. No.: 15/278,486

(22) Filed: Sep. 28, 2016

(65) Prior Publication Data

US 2017/0087956 A1   Mar. 30, 2017

(51) Int. Cl.
*B60H 1/32* (2006.01)
*B60H 1/00* (2006.01)

(52) U.S. Cl.
CPC ............ *B60H 1/00921* (2013.01); *B60H 2001/00178* (2013.01); *B60H 2001/00942* (2013.01)

(58) Field of Classification Search
CPC ............ B60H 1/0005; B60H 1/00564; B60H 1/00664; B60H 1/00835; B60H 1/00842; B60H 1/00849; B60H 1/00921; B60H 2001/00178; B60H 2001/00942; F25B 6/04
See application file for complete search history.

(56) References Cited

U.S. PATENT DOCUMENTS 5,605,051 A * 2/1997 Iritani .................. B60H 1/3211
62/160
6,178,760 B1 * 1/2001 Tanaka ............... B60H 1/00392
62/154
2011/0016896 A1 * 1/2011 Oomura ............ B60H 1/00785
62/155
2013/0333406 A1 * 12/2013 Takahashi .......... B60H 1/00921
62/238.7

FOREIGN PATENT DOCUMENTS

| CN | 103673170 A | 3/2014 |
| CN | 104185563 A | 12/2014 |
| DE | 102011052752 A1 | 2/2013 |
| DE | 102012108891 A1 | 3/2014 |
| EP | 0913283 A1 | 5/1999 |
| KR | 20140032801 A | 3/2014 |
| KR | 20150039545 A | 4/2015 |
| WO | 2015049642 A1 | 4/2015 |

* cited by examiner

*Primary Examiner* — Jonathan Bradford
(74) *Attorney, Agent, or Firm* — Shumaker, Loop & Kendrick, LLP; James D. Miller (57) ABSTRACT

An air conditioning system for a motor vehicle operable in refrigeration mode and in heat pump mode, as well as in reheating mode. The operating mode adjusted by controlling air dampers and air directing elements. The air conditioning system has a housing having a cold air flow path a warm air flow path, and an air outlet. The air outlet formed in the region of the cold air flow path and discharging air into the environment. The warm air flow path branches off from the cold air flow path. The cold air flow path and the warm air flow path lead into a first mixing chamber. The air conditioning system further includes a refrigerant circuit having a heat exchanger operable as an evaporator, a compressor, a heat exchanger operable as a first condenser/gas cooler, a heat exchanger operable as a second condenser/gas cooler, and an expansion element.

13 Claims, 7 Drawing Sheets

| Operating mode | Cooling Output $Q_0$ | Heating Output $Q_K$ | Ambient Temperature | Air Intake | Bypass Flow Path (32c) | Air Outlet to Environment (30a) | Air Damper Mixing Chamber (36) | Warm Air Flow Path (8) |
|---|---|---|---|---|---|---|---|---|
| Refrigeration | high | - | 40°C | ambient air | closed | closed | open | closed |
| Reheating I<br>- low heating output | medium | $< Q_0$ | 20°C | fresh air | as needed | closed | as needed | as needed |
| Reheating II<br>- high heating output, coolant is cold | low | $> Q_0$ | 5°C | partially recirculated air | open | open | as needed | as needed |
| Reheating III<br>- high heating output, coolant warm | low | $< Q_0$ | 5°C | partially recirculated air | closed | closed | as needed | as needed |
| Heating I<br>- no dehumidification, coolant warm | - | medium | < 0°C | fresh air | as needed | closed | as needed | as needed |
| Heating II<br>- no dehumidification, coolant cold, passenger compartment cold | - | high | < 0°C | fresh air | open | open | closed | open |
| Heating III<br>- no dehumidification, coolant warm, passenger compartment cold | - | medium | < 0°C | fresh air | open | open | closed | open |
| Heating IV<br>- no dehumidification, coolant warm, passenger compartment warm | - | medium | < 0°C | partially recirculated air | open | open | closed | open |
| Heating V<br>- no dehumidification, coolant cold, passenger compartment warm | - | high | < 0°C | partially recirculated air | open | open | closed | open |

Fig. 10

HV ICOOL LIGHT HVAC

CROSS-REFERENCE TO RELATED PATENT APPLICATIONS

This patent application claims priority to German Pat. Appl. No. DE 102015116340.3 filed on Sep. 28, 2015 and German Pat. Appl. No. DE 102016115235.8, the entire disclosures of which are incorporated herein by reference.

FIELD OF THE INVENTION

The invention relates to an air conditioning system for conditioning the air in a passenger compartment of a motor vehicle. The air conditioning system is designed to operate in refrigeration mode for cooling the air and in heat pump mode for heating the air, as well as in reheating mode. The operating mode is adjusted by controlling air dampers and air directing elements. The invention further relates to an air duct assembly for selectively supplying air mass flows to a housing of an air conditioning system for conditioning the air in a passenger compartment of a motor vehicle, and an air conditioning system having an air duct assembly situated upstream in the air flow direction.

BACKGROUND OF THE INVENTION

Air conditioning systems for motor vehicles, which have long been part of the prior art, comprise a number of individual components, such as the condenser, which is typically located at the front of the vehicle, the compressor, which is connected to and powered by the vehicle engine, the evaporator, which is located in the passenger compartment, and connecting lines. The air conditioning system conditions the air, which is then introduced into the passenger compartment.

Generic air conditioning systems that have coolant/air heat exchangers which draw their heating power from the coolant circuit of an efficient combustion engine of the vehicle drive system are not capable of achieving the temperature levels necessary for heating the passenger compartment to a comfortable temperature when ambient temperatures are low, for example below −10° C. The same is true of systems in motor vehicles powered by a hybrid drive.

Continuous improvements in the efficiency of combustion engine drives and the use of drives that comprise electric motors necessitate auxiliary heating systems to improve the heating of the air in the passenger compartment and hence the comfort of the occupants of the motor vehicle.

Various auxiliary heating systems for vehicle air conditioning systems are known from the prior art. In addition to electric auxiliary heating systems, refrigerant circuits that are operated in heat pump mode are used. For example, glycol/air heat pumps use the coolant from the combustion engine as a heat source. In that case, heat is drawn from the coolant. As a result, the combustion engine is operated for extended periods of time at low temperatures, which has a negative impact on exhaust emissions and fuel consumption. In hybrid vehicles, the intermittent operation of the combustion engine keeps coolant temperatures from reaching a sufficient level on long trips. As a result, the start/stop operation of the combustion engine is suspended when ambient temperatures are low. The combustion engine is not switched off.

Moreover, with fully electrified drive systems, for example in vehicles that are powered by batteries or fuel cells, the waste heat of the combustion engine is eliminated as a potential heat source for heating the air. In addition, the amount of energy that can be stored in the battery of the vehicle is lower than the amount of energy that can be stored in the form of liquid fuel inside the fuel tank. Thus the amount of power that is required for air-conditioning the passenger compartment of an electrically powered vehicle also has a significant impact on the range of the vehicle.

In addition to air conditioning systems that ensure a heating function for the air mass flow to be supplied to the passenger compartment by reversing the flow path of the refrigerant within the refrigerant circuit, the prior art also includes air conditioning systems embodied as compact modules, in which, using a standard refrigerant circuit, any mixing temperature of the air to be supplied to the passenger compartment can be provided by selectively controlling on the air side the functions of heating, cooling, dehumidifying, and reheating.

DE 10 2011 052 752 A1 describes a modular vehicle air conditioning system for heating and cooling air. The vehicle air conditioning system comprises a housing having a blower and dampers for adjusting air flow paths, and a refrigerant circuit having a condenser, an evaporator, a compressor, an expansion element and associated connecting lines. An evaporator air flow path with an integrated evaporator and a condenser air flow path with an integrated condenser are formed in the housing. Fresh air from the environment, recirculated air from the passenger compartment or a mixture of the two can be supplied to each air flow path. The two air flow paths are connected to one another via controllable dampers such that the passenger compartment is heated or cooled solely by adjusting the flow path of the air.

DE 10 2012 108 891 A1 discloses an air conditioning system for cooling and heating the air to be supplied to the passenger compartment and for reheating operation, comprising a housing having two flow channels for conducting air, and a refrigerant circuit having an evaporator and a condenser. The evaporator is arranged in the first flow channel and the condenser is arranged in the second flow channel. The operating mode is adjusted solely by controlling air directing elements. Either the evaporator or condenser heat exchanger is arranged with a part of its heat transfer surface in the first flow channel, with the respectively other heat exchanger being arranged similarly in the second flow channel.

Thus in air conditioning systems embodied as compact modules, a warm air flow conducted over the heat transfer surface of a condenser and a cold air flow conducted over the heat transfer surface of an evaporator are mixed according to the desired delivered air temperatures. After cooling and/or dehumidifying, the cold air flow can also be conducted over the heat transfer surface of the condenser and thereby reheated. During reheating operation, the air to be supplied to the passenger compartment is cooled and thereby dehumidified, and is then slightly heated. In this operating mode, typically less reheating power is required than the cooling power that is required for cooling and dehumidifying the air.

The conditioned air is conducted through an air distribution system having various air outlets and outlet control elements to corresponding air outlets, such as at least one air outlet directed toward the windshield, one air outlet directed toward the occupants and one air outlet directed toward a footwell, into the passenger compartment. Excess air is discharged from the air distribution system through additional air outlets into the environment surrounding the motor vehicle.

However, air conditioning systems that are embodied as compact modules and controlled on the air side require a vehicle architecture that is modified substantially from that of known motor vehicles, therefore they cannot be used in conventional motor vehicles.

In air conditioning systems that are controlled on the refrigerant circuit side in combined cooling and heat pump operation for heating, cooling and dehumidifying the air to be supplied to the passenger compartment and conditioned, the refrigerant circuits in particular typically have a multiplicity of components, such as switchover valves. The refrigerant circuits are highly complex, resulting in high costs and high technical effort. In addition, the capacity of these air conditioning systems, particularly at low ambient temperatures, is not sufficient to ensure the desired comfort of the occupants of the passenger compartment.

SUMMARY OF THE INVENTION

The object of the invention is to provide a compact air conditioning system for motor vehicles. The refrigerant circuit is to be designed as having only a minimum number of components and thus as simple and inexpensive, and requiring low maintenance. The components, which are embodied as standard components wherever possible, are to be positioned in the conventional manner in the motor vehicle. The air conditioning system is also to be designed for combined operation in refrigeration mode and in heat pump mode as well as in reheating mode for heating, cooling, and dehumidifying the air in the passenger compartment to be conditioned. The system is to be capable of operating even in situations that involve low capacity heat sources, for example in energy efficient combustion engines or hybrid drives comprising combustion engine and electric engine, for example, or when heat sources from the drive are not available, for example, with electrically powered vehicles, while still meeting all requirements for producing a comfortable climate in the passenger compartment with maximum efficiency.

The object is achieved by the subjects having the features of the independent claims. Enhancements are specified in the dependent claims.

The object is achieved by an air conditioning system according to the invention for conditioning the air in a passenger compartment of a motor vehicle. The air conditioning system is designed to operate in refrigeration mode for cooling the air and in heat pump mode for heating the air, as well as in reheating mode. The operating mode is adjusted by controlling air dampers and air directing elements.

According to the concept of the invention, the air conditioning system comprises a housing having a cold air flow path and a warm air flow path for conducting air, along with an air outlet. The air outlet, located in the region of the cold air flow path for discharging the air to the environment around the air conditioning system and the warm air flow path is embodied as branching off from the cold air flow path. The cold air flow path and the warm air flow path lead into a first mixing chamber.

The air conditioning system is also designed as comprising a refrigerant circuit having a heat exchanger that operates as an evaporator, a compressor, a heat exchanger that operates as a first condenser/gas cooler, a heat exchanger that operates as a second condenser/gas cooler, and an expansion element. The evaporator is positioned within the cold air flow path, the first condenser/gas cooler is positioned as a heating heat exchanger within the warm air flow path, and the second condenser/gas cooler is positioned outside of the housing.

According to the invention, the air outlet and the warm air flow path are embodied as branching off from the cold air flow path, downstream of the heat exchanger operated as an evaporator in the air flow direction.

If the refrigerant is liquefied during subcritical operation, for example when the refrigerant R134a is used or under certain environmental conditions with carbon dioxide, the heat exchangers for liquefying the refrigerant are referred to as condensers. Part of the heat exchange takes place at a constant temperature. During supercritical operation or with supercritical heat output in the heat exchanger, the temperature of the refrigerant decreases steadily. In that case, the heat exchanger is also referred to as a gas cooler. Supercritical operation can occur under certain environmental conditions or operating modes of the refrigerant circuit, for example, with the refrigerant carbon dioxide.

The operating mode of the air conditioning system is advantageously adjusted solely by controlling the air dampers and air directing elements.

An air damper is understood as an element embodied, for example, for closing and opening a single flow path, in particular an air duct. In contrast, an air control element is designed for simultaneously opening and closing multiple flow paths, in particular at least two air ducts.

The air dampers and air directing elements are advantageously designed as adjustable and arranged such that an air mass flow conducted over the heat transfer surface of the heat exchanger which operates as an evaporator is conducted directly through the air outlet into the environment.

According to one enhancement of the invention, the first condenser/gas cooler and the second condenser/gas cooler are arranged in sequence inside the refrigerant circuit in the direction of flow of the refrigerant. The designations as first and second condenser/gas cooler refer to the direction of flow of the refrigerant and thus to the sequential flow through the heat exchangers in the specified sequence. The heat exchangers arranged connected to one another in sequence are preferably connected to one another solely via a connecting line, without additional components.

In a preferred embodiment of the invention, the second condenser/gas cooler is arranged such that it can be supplied with ambient air. For this purpose, air dampers for adjusting the air mass flow of the ambient air are provided upstream of the condenser/gas cooler in the direction of ambient air flow.

These air dampers are advantageously designed as infinitely adjustable. Depending on the position of the air dampers, the air mass flow of the ambient air is adjusted between a maximum and zero.

According to an advantageous embodiment of the invention, the housing of the air conditioning system has a bypass flow path around the heat exchanger operated as an evaporator. The bypass flow path is designed to be closed and opened by means of an infinitely adjustable air damper or air directing element.

According to an enhancement of the invention, the bypass flow path and the cold air flow path are embodied as leading to a second mixing chamber. The warm air flow path preferably branches off from the common second mixing chamber.

The air dampers and air directing elements provided within the housing are preferably embodied as adjustable and are arranged such that an air mass flow conducted through the bypass flow path is conducted directly into the warm air flow path.

According to a first alternative embodiment of the invention, an air directing element is embodied as infinitely adjustable between two end positions. In this case, in a first end position of the air directing element the air outlet is closed and a cold air flow path toward the second mixing chamber and the warm air flow path is open. In a second end position of the air directing element, the air outlet is open and the cold air flow path toward the second mixing chamber and the warm air flow path is closed.

According to a second alternative embodiment of the invention, an air directing element is embodied as infinitely adjustable between two end positions. In this case, in a first end position of the air directing element the bypass flow path is closed and a cold air flow path toward the warm air flow path is open, and in a second end position of the air directing element, the bypass flow path is open and the cold air flow path toward the warm air flow path is closed.

In a further advantageous embodiment of the invention, an additional heating heat exchanger is arranged within the warm air flow path along with the first condenser/gas cooler of the refrigerant circuit. In this case, the heating heat exchangers are arranged in sequence in the direction of flow of the air mass that is conducted through the warm air flow path.

The additional heating heat exchanger, also referred to as the first heating heat exchanger, is preferably embodied as a component of a coolant circuit. The first heating heat exchanger is arranged upstream of the second heating heat exchanger embodied as a condenser/gas cooler in the direction of flow of the air mass that is conducted through the warm air flow path.

The designations as first and second heating heat exchangers refer to the direction of flow of the air mass through the warm air flow path and thus to the flow in succession and thus sequentially through the heat exchangers in the specified sequence.

The object is further achieved by an air duct assembly according to the invention for selectively supplying air mass flows to a housing of an air conditioning system for conditioning the air in a passenger compartment of a motor vehicle. The air duct assembly comprises a blower for drawing fresh air in from the environment and/or recirculated air from the passenger compartment, and a fresh air intake and a recirculated air intake, each having an air damper. The cross-sections of the fresh air intake and the recirculated air intake are designed to be closed and opened by means of the respective air dampers.

According to the concept of the invention, the air duct assembly has a diffuser having at least two flow paths which are fluidically separate from one another. In addition, the blower is designed as dual-duct with two impellers, the first impeller being configured to convey an air mass flow through the first flow path and the second impeller being configured to convey an air mass flow through the second flow path.

According to an enhancement of the invention, the fresh air intake and the recirculated air intake are fluidically connected to one another. In this case, an opening formed between the fresh air intake and the recirculated air intake is designed to be closed and opened by means of an air damper.

In an advantageous embodiment of the invention, the flow paths formed within the diffuser can be fluidically connected to one another, in which case an opening that is formed between the flow paths is designed to be closed and opened by means of an air directing element.

The object is also achieved by an air conditioning system according to the invention having an air duct assembly situated upstream in the air flow direction for selectively supplying air mass flows to the cold air flow path and to the bypass flow path of the housing. According to the concept of the invention, the heat exchanger operated as an evaporator is arranged within the cold air flow path and the diffuser of the air duct assembly is embodied as a connecting element to the housing, with the first flow path formed within the diffuser leading into the bypass flow path of the housing of the air conditioning system, and the second flow path formed within the diffuser leading into the cold air flow path of the housing of the air conditioning system.

According to an advantageous embodiment of the invention, the air directing element of the ventilation assembly is embodied as continuously adjustable between two end positions. In this case, in a first end position of the air directing element, the opening formed between the flow paths is closed and the flow paths are open. In a second end position of the air directing element, the opening formed between the flow paths is open, whereas the first flow path is closed.

The air conditioning system according to the invention combined with the ventilation assembly according to the invention has various advantages:

- a substantial increase in efficiency, particularly during operation at low ambient temperatures, over conventional systems operated as heat pumps, in particular
- a rapid delivery of warm air when ambient temperatures are low and the coolant within the engine coolant circuit is cold in motor vehicles powered by a combustion engine and
- a further increase in efficiency at certain operating points by supplying fresh air and recirculated air to the individual regions by means of the dual-duct blower in the air duct assembly,
- a reduction in the amount of power that is required to heat the passenger compartment by recirculated air operation and/or by selective air guidance within the flow ducts, optionally diverting air that is not required in the passenger compartment to the environment,
- minimal complexity of the refrigerant circuit, that is to say a substantial elimination of switchover valves and a minimization of the number of expansion valves, heat exchangers, and refrigerant lines, wherein, by using a conventional refrigerant circuit supplemented by an additional heat exchanger,
- a heating function or an auxiliary heating function is enabled,
- the arrangement of the components of the refrigerant circuit in the motor vehicle remains unchanged and the vehicle architecture is modified only slightly from that of conventional systems, and
- minimal production, assembly and maintenance costs are incurred.

BRIEF DESCRIPTION OF THE DRAWINGS

Additional details, features and advantages of the invention will be apparent from the following description of embodiment examples, with reference to the accompanying set of drawings. The drawings show.

DESCRIPTION OF SPECIFIC EMBODIMENTS

Figure 1:
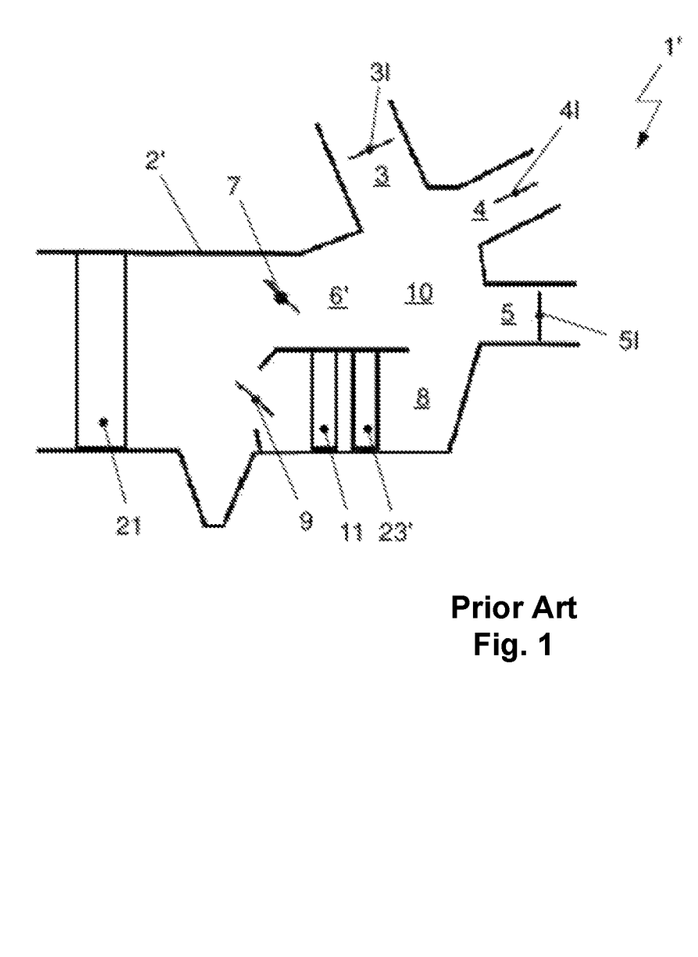
FIG. 1: an air conditioning system of the prior art with a housing having a cold air flow path and a warm air flow path for and air outlets into the passenger compartment, and heat exchangers for conditioning the air mass flows.

FIG. 1 shows an air conditioning system 1' of the prior art having a housing 2' with a cold air flow path 6' and a warm air flow path 8, along with air outlets 3, 4, 5 into the passenger compartment. Air conditioning system 1' has two heating heat exchangers 11, 23', and one heat exchanger 21 operated as an evaporator in a refrigerant circuit (not shown) for conditioning the air mass flows.

The air mass flow to be conditioned is drawn into housing 2' by a blower (not shown) and is conducted over the heat transfer surface of evaporator 21. Evaporator 21 occupies the entire flow cross-section of housing 2'. As air flows over the heat transfer surface of evaporator 21, heat is transferred from the air to the evaporating refrigerant. The air mass flow is thereby cooled and/or dehumidified.

The cold air mass flow exiting evaporator 21 can be conducted in each case as a partial air mass flow through cold air flow path 6' and through warm air flow path 8 to mixing chamber 10. The cold air mass flow is either divided in the necessary ratio or directed in full to one of flow paths 6', 8. The cross-section of cold air flow path 6' is closed or opened by an air damper 7, and the cross-section of warm air flow path 8 is closed or opened by an air damper 9. The air dampers 7, 9, which are infinitely adjustable between the two end positions of open and closed, are disposed at the intakes into flow paths 6', 8, respectively.

Within warm air flow path 8, a first heating heat exchanger 11 and a second heating heat exchanger 23' are formed, which are arranged sequentially with respect to the air mass flow, and over which the air mass flows in sequence. Heating heat exchangers 11, 23' each occupy the entire flow cross-section of the warm air flow path 8. As the air flows over the heat transfer surfaces of the heating heat exchangers 11, 23', heat is transferred to the air mass flow as needed, which is thereby heated.

The first heating heat exchanger 11 is preferably embodied as a component of a coolant circuit, for example of a combustion engine in a motor vehicle powered by a combustion engine. The second heating heat exchanger 23' is embodied as an additional heating heat exchanger, for example a component of an electric resistance heater or a fuel burner. However, auxiliary electric heating by means of resistance heating impacts the efficiency, for example, of an electric vehicle, particularly its air conditioning system. The range of the motor vehicle is dramatically reduced as a result.

Cold air flow path 6' and warm air flow path 8 each lead into mixing chamber 10, so that the partial air mass flows which are subdivided into cold air flow path 6' and warm air flow path 8 are largely mixed in mixing chamber 10 and are then subdivided as a conditioned air mass flow as needed among an air outlet 3 directed toward the windshield, an air outlet 4 directed toward the occupants, and an air outlet 5 directed toward a footwell, and are introduced into the passenger compartment. The cross-sections of air outlets 3, 4, 5 are each closed or opened by means of an air damper 3*l*, 4*l*, 5*l*.

Figure 2:
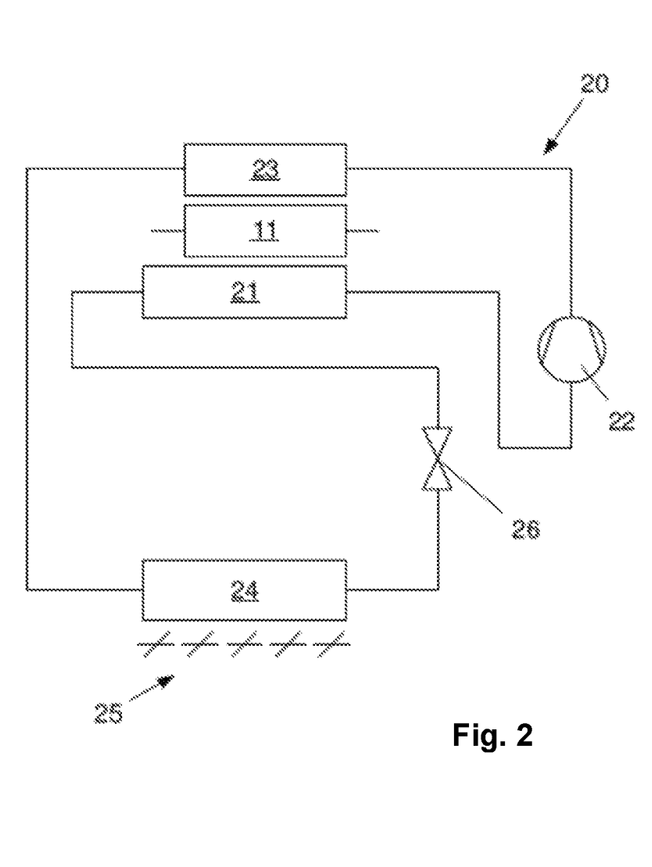
FIG. 2: a refrigerant circuit of an air conditioning system having an additional heating heat exchanger, an air conditioning system having heat exchangers for conditioning the air mass flows and a housing having a cold air flow path and a warm air flow path, and air outlets into the passenger compartment.

FIG. 2 shows a refrigerant circuit 20 of an air conditioning system having a second heating heat exchanger 23, provided in addition to the first heating heat exchanger 11. The first heating heat exchanger 11 is again preferably a component of a coolant circuit (not shown).

Refrigerant circuit 20 has a compressor 22, a heat exchanger 23 operated as a desuperheating heater and optionally as a first condenser/gas cooler, a second heat exchanger 24 operated optionally as a desuperheating heater and a second condenser/gas cooler, an expansion element 26, and an evaporator 21.

The refrigerant, which flows out of compressor 22 at the level of the high pressure as a hot gas, is desuperheated and liquefied as required, that is, based on the open warm air flow path 8 and based on the transfer of heat in the first heating heat exchanger 11 to the partial air mass flow as it flows through the first condenser/gas cooler 23, and is then conducted through the second heat exchanger 24 which operates as a condenser/gas cooler.

In contrast to conventional refrigerant circuits of air conditioning systems, in addition to heat exchanger 23 which operates as first condenser/gas cooler, refrigerant circuit 20 comprises an additional heat exchanger, which is arranged within refrigerant circuit 20 directly following compressor 22 in the direction of flow of the refrigerant.

As it flows through heat exchanger 24, which is advantageously located at the front of the vehicle, in particular within a cooling module, the refrigerant is liquefied and optionally supercooled. The heat is transferred from the refrigerant to the ambient air. As a result, the waste heat of refrigerant circuit 20 is dissipated to the ambient air. The air mass flow of the ambient air is controlled by the positioning of air directing systems, in particular air dampers 25.

After exiting the second condenser/gas cooler 24, the liquid refrigerant is conducted to expansion element 26. As it flows through expansion element 26, the refrigerant is expanded to evaporation pressure and is conducted to evaporator 21.

As it flows through evaporator 21, the refrigerant is evaporated and superheated by absorbing heat. In this process, the heat is transferred from the air mass flow to be conditioned for the passenger compartment to the refrigerant. The air that is conveyed over the heat transfer surface of evaporator 21 by means of a blower is cooled and/or dehumidified. The superheated and gaseous refrigerant exiting evaporator 21 is drawn in by compressor 22. Refrigerant circuit 20 is closed.

Heat exchangers 21, 11, 23 are arranged in the specified sequence in the direction of flow of the air mass flow to be conditioned within a housing (not shown) to which air is supplied. The additional second heating heat exchanger 23 is thus located downstream of evaporator 21, for example in place of a heating heat exchanger 11 to which coolant from an engine coolant circuit is supplied in the case of electromotively powered motor vehicles or hybrid vehicles, or in addition to the heating heat exchanger 11 to which coolant from an engine coolant circuit is supplied in the case of an auxiliary heating system in motor vehicles powered by a combustion engine.

When the air conditioning system, in particular refrigerant circuit 20, is operated in heat pump mode, controlled on the air side, the heat to be transferred to the air mass flow to be supplied to the passenger compartment is greater than the refrigerating power required for cooling and/or for dehumidifying the air mass flow, so that the air mass flow to be cooled in the evaporator 21 is significantly larger than the air mass flow to be supplied to the passenger compartment.

Figure 3A:
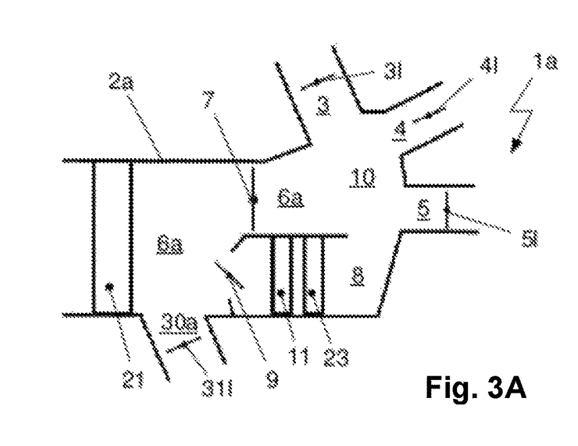
FIGS. 3A, 3B: having an air outlet to the environment formed in the region of the cold air flow path and upstream of the intake into the warm air flow path.
Figure 3B:
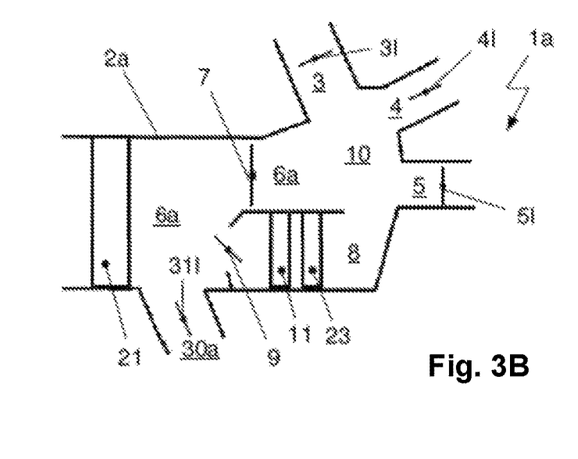

FIGS. 3A and 3B show an air conditioning system 1a having heat exchangers 21, 11, 23 for conditioning the air mass flows, and a housing 2a having a cold air flow path 6a and a warm air flow path 8, and air outlets 3, 4, 5 into the passenger compartment. In contrast to housing 2' of FIG. 1, housing 2a has an air outlet 30a to the environment surrounding housing 2a, more particularly the environment surrounding the motor vehicle, said outlet being formed in the region of cold air flow path 6a and upstream of the intake into warm air flow path 8.

Air outlet 30a for discharging air to the environment surrounding housing 2a is located downstream of evaporator 21 and upstream of the intake into warm air flow path 8 in the direction of flow of the air mass, and therefore upstream of heating heat exchanger 23.

The cross-section of air outlet 30a is closed or opened by means of a movable air damper 31l. Air damper 31l positioned within air outlet 30a is infinitely adjustable between the two end positions of open and closed. FIG. 3A shows air damper 31l in the closed end position and FIG. 3B shows air damper 31l in the open end position.

Figure 4A:
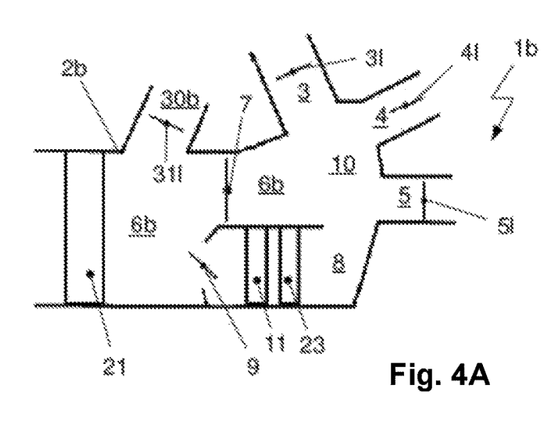
FIGS. 4A, 4B: having an air outlet to the environment formed in the region of the cold air flow path.
Figure 4B:
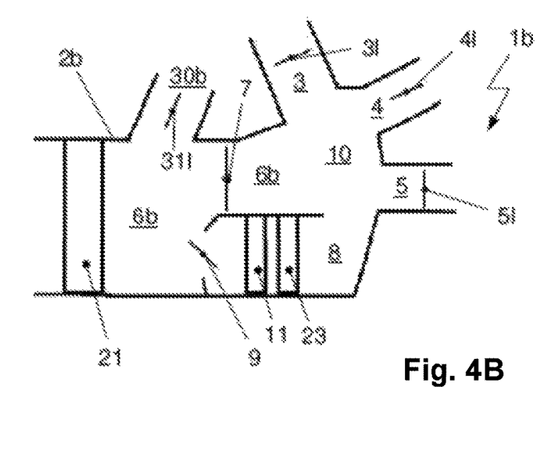

FIGS. 4A and 4B show an air conditioning system 1b having heat exchangers 21, 11, 23 for conditioning the air mass flows, and a housing 2b having a cold air flow path 6b and a warm air flow path 8, and air outlets 3, 4, 5 into the passenger compartment. In contrast to housing 2' of FIG. 1 and to housing 2a of FIGS. 3A and 3B, housing 2b has an air outlet 30b to the environment surrounding housing 2b, more particularly to the environment surrounding the motor vehicle, said outlet being formed in the region of cold air flow path 6b. Air outlet 30b is disposed in a plane which is situated substantially perpendicular to the direction of air flow, on a side of cold air flow path 6b opposite the intake into warm air flow path 8.

Air outlet 30b for discharging air into the environment surrounding housing 2b is therefore likewise provided downstream of evaporator 21 in the direction of flow of the air mass.

The cross-section of air outlet 30b is closed or opened by means of an air damper 31l which is infinitely adjustable between two end positions, with FIG. 4A showing air damper 31l in the closed end position and FIG. 4B showing air damper 31l in the opened end position.

During normal operation of refrigerant circuit 20 without a heating function, for example, in refrigeration mode for cooling the air mass flow to be supplied to the passenger compartment, or in heating mode involving a transfer of heat from the coolant of the engine coolant circuit in the first heating heat exchanger 11 to the air mass flow to be supplied to the passenger compartment, air outlet 30a, 30b is closed. Thus either the entire cooled and/or dehumidified air mass flow flows as needed from evaporator 21 through cold air flow path 6a, 6b and thus around first heating heat exchanger 11 into mixing chamber 10, or through warm air flow path 8 through heating heat exchanger 11 into mixing chamber 10, or is divided proportionally into partial air mass flows through cold air flow path 6a, 6b and warm air flow path 8. Air dampers 7, 9 thus enable the temperature of the air mass flow that is supplied to the passenger compartment to be adjusted between "maximally cool" and "maximally warm".

If additional heat for transfer to the air mass flow to be supplied to the passenger compartment is required when refrigerant circuit 20 is operating in heat pump mode, the air flow through housing 2a, 2b of air conditioning system 1a, 1b is increased and air outlet 30a, 30b is opened. As a result, a greater air mass flow is cooled and/or dehumidified in evaporator 21, with more heat being transferred to the refrigerant than during normal operation without a heating function of the refrigerant circuit 20. The portion of the air mass flow that is cooled and/or dehumidified in evaporator 21 and will not be supplied to the passenger compartment is discharged as excess air to the environment through the open air outlet 30a, 30b, and the quantity of the air mass flow to be supplied to the passenger compartment is adjusted. The air mass flow to be supplied to the passenger compartment as a portion of the total air mass flow conducted through evaporator 21 is conducted in full through warm air flow path 8, and thus through second heating heat exchanger 23 into mixing chamber 10. In heating heat exchanger 23, heat is transferred from the refrigerant to the air mass flow.

Figure 5A:
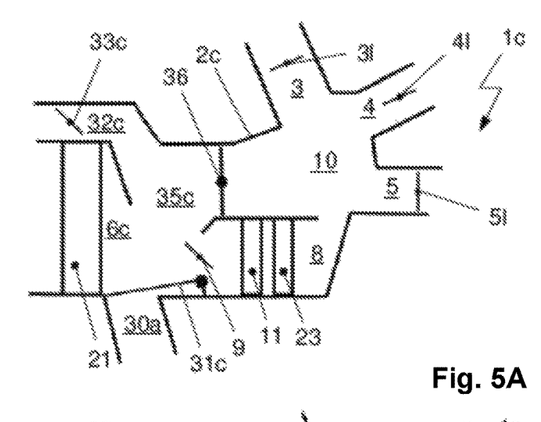
FIGS. 5A, 5B: having an air outlet to the environment formed in the region of the cold air flow path and upstream of the intake into the warm air flow path, according to FIGS. 3A, 3B, along with a bypass flow path around a heat exchanger operated as an evaporator, which leads to a mixing chamber, and an air directing element for the air outlet to the environment.
Figure 5B:
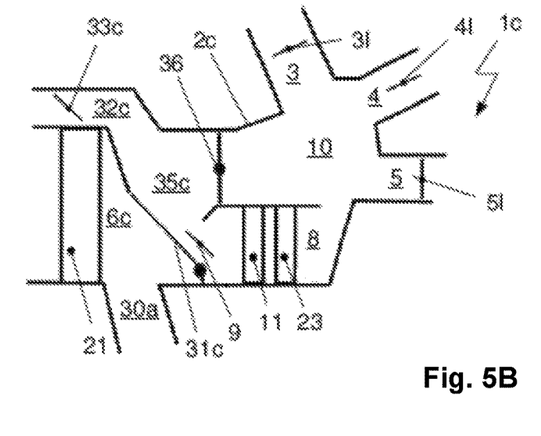

FIGS. 5A and 5B show an air conditioning system 1c having heat exchangers 21, 11, 23 for conditioning the air mass flows, and a housing 2c having a cold air flow path 6c and a warm air flow path 8, and air outlets 3, 4, 5 to the passenger compartment. Similarly to housing 2a of FIGS. 3A and 3B, housing 2c has an air outlet 30a to the environment surrounding housing 2c, more particularly to the environment surrounding the motor vehicle, said outlet being formed in the region of cold air flow path 6c and upstream of the intake into warm air flow path 8.

In addition, housing 2c is equipped with a bypass flow path 32c around heat exchanger 21 which operates as an evaporator, said flow path leading into a second mixing chamber 35c. The cross-section of bypass flow path 32c is closed or opened by means of an air damper 33c, which is infinitely adjustable between two end positions. A portion of the air mass flow conveyed into housing 2c is conducted bypassing evaporator 21, depending on the position of air damper 33c.

Housing 2c further has an air directing element 31c, which is infinitely adjustable between two end positions, for air outlet 30a to the surrounding environment.

The air mass flow conveyed into housing 2c is subdivided as needed in a required ratio into a partial air mass flow through bypass flow path 32c, and thus around evaporator 21, and a partial air mass flow through evaporator 21, and thus through cold air flow path 6c, or is fed in full to either bypass flow path 32c or cold air flow path 6c.

In a first end position of air directing element 31c according to FIG. 5A, air outlet 30a to the environment is closed, whereas cold air flow path 6c is open toward mixing chamber 35c and warm air flow path 8. The total air mass flow conveyed into housing 2c is directed either in portions or in full through bypass flow path 32c or through cold air flow path 6c into second mixing chamber 35c. When the air mass flow is subdivided, the partial air mass flows are mixed in mixing chamber 35c. The air mass flow is then conducted, either in portions or in full, through warm air flow path 8 or around warm air flow path 8 into first mixing chamber 10, depending on the adjustment of an air damper 36 positioned between the second mixing chamber 35c and the first mixing chamber 10, and an air damper 9 for warm air flow path 8. When the air mass flow is subdivided, the partial air mass flows are mixed in mixing chamber 10.

In a second end position of air directing element 31c according to FIG. 5B, air outlet 30a to the environment is open, whereas cold air flow path 6c toward second mixing chamber 35c and the warm air flow path is closed. In this case, the air mass flow conveyed into housing 2c is conveyed in portions through bypass flow path 32c and through cold air flow path 6c. The partial air mass flow conveyed through cold air flow path 6c and thus through evaporator 21 is cooled and/or dehumidified and is then delivered through air outlet 30a to the environment surrounding housing 2c. Depending on the position of air damper 36 and of air damper 9, the partial air mass flow conveyed through bypass flow path 32c can be conducted either in portions or in full through warm air flow path 8 or around warm air flow path 8 into first mixing chamber 10. The partial air mass flow conveyed through bypass flow path 32c, for example, can thereby be conducted around evaporator 21 directly to warm air flow path 8 and through the second heating heat exchanger 23, with the partial air mass flow that flows through evaporator 21 being discharged by means of air directing element 31c through air outlet 30a to the environment. Warm air flow path 8 with heating heat exchanger 23 is closed off from the region around evaporator 21, in particular cold air flow path 6c. The partial air mass flow which is warm and is therefore not conducted through evaporator 21 and cooled is thus conveyed directly to heating heat exchanger 23, thereby reducing the amount of power required to heat the partial air mass flow due to the higher intake temperature of the partial air mass flow at heating heat exchanger 23. At the same time, the partial air mass flow flowing through evaporator 21 is cooled and/or dehumidified, in which process the heat is transferred from the air to the refrigerant.

Figure 6A:
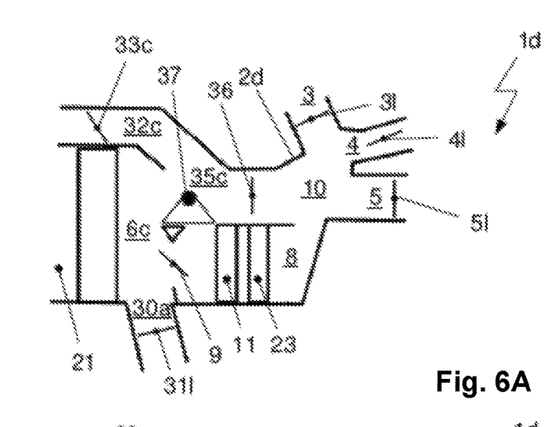
FIGS. 6A, 6B: having the air outlet to the environment formed in the region of the cold air flow path and upstream of the intake into the warm air flow path, according to FIGS. 3A, 3B, along with the bypass flow path around the heat exchanger operated as an evaporator, which leads to the mixing chamber, and an air directing element arranged in the region of the opening of the bypass flow path.
Figure 6B:
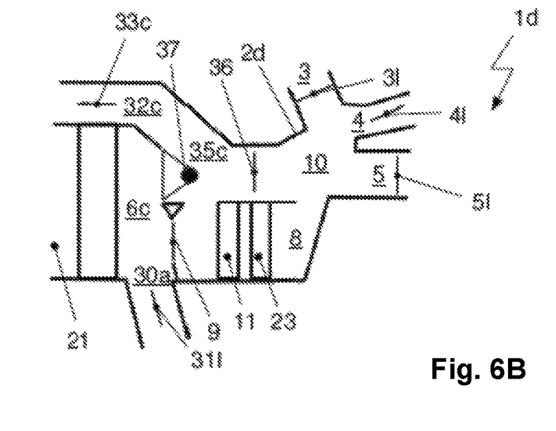

FIGS. 6A and 6B show an air conditioning system 1d, similar to air conditioning system 1c of FIGS. 5A and 5B, having heat exchangers 21, 11, 23 for conditioning the air mass flows, and a housing 2d having cold air flow path 6c and warm air flow path 8, and air outlets 3, 4, 5 to the passenger compartment. Similarly to housing 2a of FIGS. 3A and 3B, housing 2d has air outlet 30a to the environment surrounding housing 2d, said outlet being formed in the region of cold air flow path 6c and upstream of the intake into warm air flow path 8, and bypass flow path 32c around heat exchanger 21 which operates as an evaporator, said flow path opening into second mixing chamber 35c, and an air directing element 37, which is infinitely adjustable between two end positions and is positioned in the region where bypass flow path 32c opens up.

The difference between air conditioning system 1c of FIGS. 5A and 5B and air conditioning system 1d shown in FIGS. 6A and 6B is the alternative embodiment of the combination of air damper 31l of air outlet 30a with air damper 9 of warm air flow path 8 and air directing element 37 of air conditioning system 1d, as compared with the combination of air damper 9 of warm air flow path 8 with air directing element 31c of air conditioning system 1c.

Depending on the positioning and the adjustment of air dampers 31l and 9 and air directing element 37, the operating modes described in connection with air conditioning system 1c of FIGS. 5A and 5B can be adjusted, so that in a first end position according to FIG. 6A, air outlet 30a to the environment is closed whereas cold air flow path 6c toward second mixing chamber 35c or toward warm air flow path 8 is open, and in a second end position according to FIG. 6B, air outlet 30a to the environment is open, whereas cold air flow path 6c toward second mixing chamber 35c or toward warm air flow path 8 is closed.

Figure 7A:
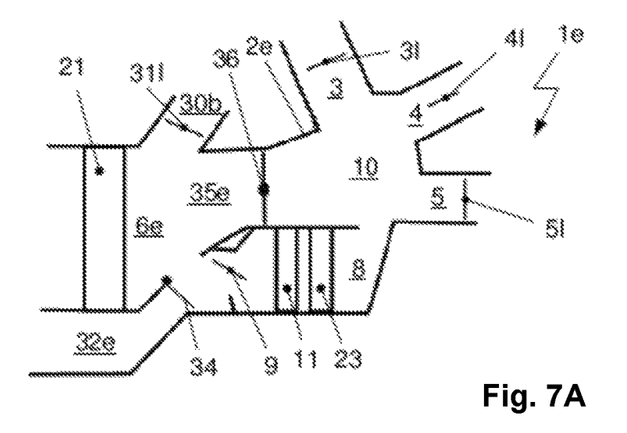
FIGS. 7A, 7B: having the air outlet to the environment formed in the region of the cold air flow path, according to FIGS. 4A, 4B, along with a bypass flow path around the heat exchanger operated as an evaporator, which leads to the region of the warm air flow path, and an air directing element for the bypass flow path.
Figure 7B:
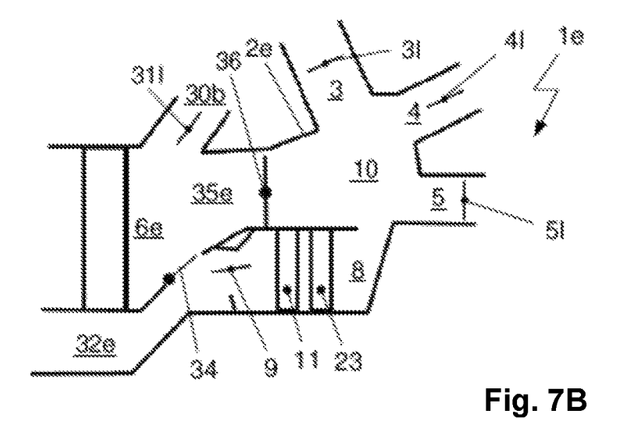

FIGS. 7A and 7B show an air conditioning system 1e, similar to air conditioning system 1c of FIGS. 5A and 5B, with heat exchangers 21, 11, 23 for conditioning the air mass flows, and a housing 2e having a cold air flow path 6e and a warm air flow path 8, and air outlets 3, 4, 5 to the passenger compartment. Similarly to housing 2b of FIGS. 4A and 4B, housing 2e has an air outlet 30b to the environment surrounding housing 2e, more particularly to the environment surrounding the motor vehicle, said outlet being formed in the region of cold air flow path 6e. Air outlet 30b is again disposed in a plane arranged substantially perpendicular to the direction of air flow, on a side of cold air flow path 6b opposite the intake into warm air flow path 8.

In contrast to air conditioning system 1c of FIGS. 5A and 5B, housing 2e is formed with a bypass flow path 32e around heat exchanger 21 operated as an evaporator, said flow path leading in the region of warm air flow path 8 into a second mixing chamber 35e. The cross-section of bypass flow path 32e is closed or opened by means of an air directing element 34 which is infinitely adjustable between two end positions. Depending on the position of air directing element 34, a portion of the air mass flow conveyed into housing 2e is conducted around evaporator 21.

Housing 2e further has the air damper 31l for air outlet 30b to the environment, which is infinitely adjustable between two end positions.

In a first end position of air damper 31l and air directing element 34 according to FIG. 7A, both air outlet 30b to the environment and bypass flow path 32e are closed, whereas cold air flow path 6e toward warm air flow path 8 or toward first mixing chamber 10 is open. In this case, the entire air mass flow conveyed into housing 2e is conveyed through cold air flow path 6e into second mixing chamber 35e. Depending on the adjustment of air damper 36 arranged between second mixing chamber 35e and first mixing chamber 10 and of air damper 9 for warm air flow path 8, the air mass flow is then conducted either in portions or in full through warm air flow path 8 or around warm air flow path 8 into first mixing chamber 10. If the air mass flow is subdivided, the partial air mass flows are mixed in mixing chamber 10.

In a second end position of air damper 31l and air directing element 34 according to FIG. 7B, air outlet 30b to the environment is open, whereas cold air flow path 6e toward warm air flow path 8 and toward first mixing chamber 10 is closed. In this case, the air mass flow conveyed into housing 2e is conveyed in portions through bypass flow path 32e and through cold air flow path 6e. The partial air mass flow conveyed through cold air flow path 6e and thus through evaporator 21 is cooled and/or dehumidified and is then discharged through air outlet 30a into the environment surrounding housing 2c. The partial air mass flow conveyed through bypass flow path 32e is conducted in full, with air damper 9 of warm air flow path 8 open, through warm air flow path 8 into first mixing chamber 10.

As with air conditioning systems 1c, 1d of FIGS. 5B, 6B, the partial air mass flow conveyed through bypass flow path 32e is thus conducted around evaporator 21 directly to warm air flow path 8 and through second heating heat exchanger 23, and the partial air mass flow that is flowing through evaporator 21 is discharged by means of air damper 31l and air directing element 34 through air outlet 30b into the environment. Warm air flow path 8 with heating heat exchanger 23 is closed with respect to the region around evaporator 21, in particular cold air flow path 6e.

If, in addition, the second condenser/gas cooler 24 arranged within the cooling module of the motor vehicle is closed by means of air damper 25 while at the same time, warm air from the passenger compartment is conveyed as recirculated air to evaporator 21, the efficiency of the air conditioning system 1c, 1d, 1e can be further increased.

Fresh air from the environment, recirculated air from the passenger compartment, or a mixture of fresh air and recirculated air is supplied to each of the housings 2a, 2b, 2c, 2d and 2e.

Figure 8A:
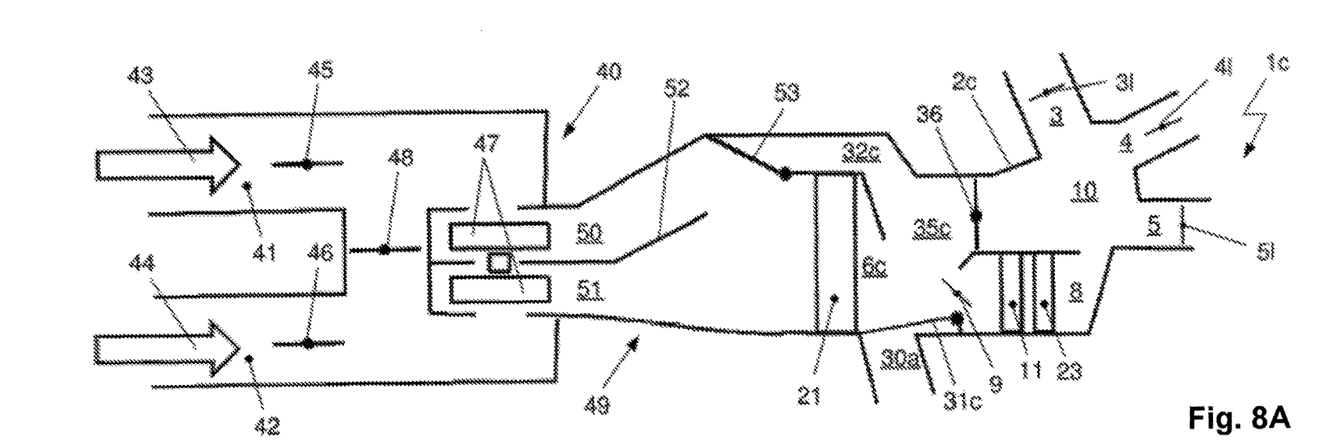
FIGS. 8A, 8B: in accordance with FIGS. 5A, 5B, having an air duct assembly arranged upstream in the direction of air flow, with a dual-duct blower for drawing in fresh air and/or recirculated air, and an air directing element embodied as an air damper.
Figure 8B:
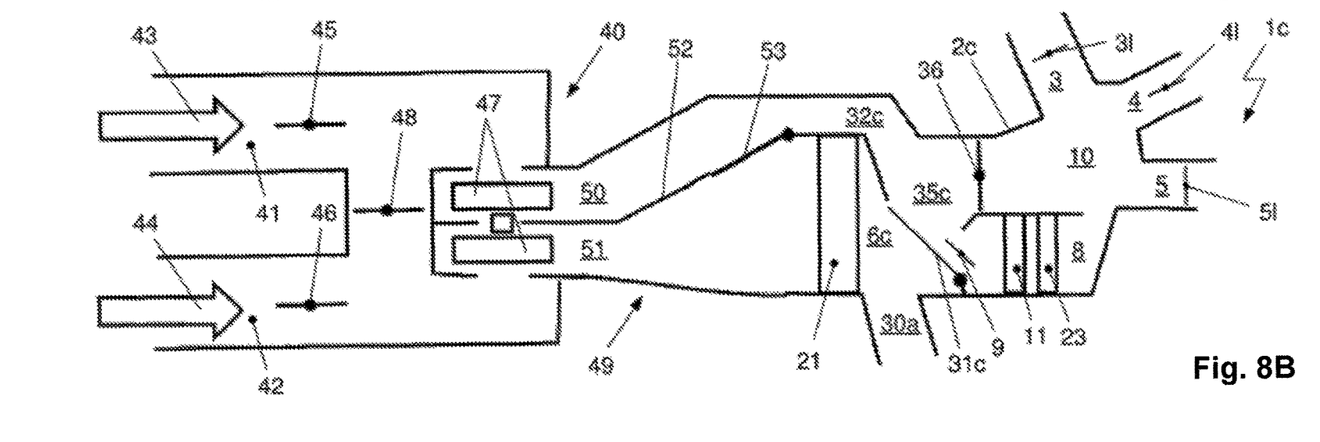

FIGS. 8A and 8B show air conditioning system 1c of FIGS. 5A and 5B having an air duct assembly 40 arranged upstream in the direction of air flow, for selectively supplying air mass flows to the evaporator 21 or to bypass flow path 32c around evaporator 21. Air duct assembly 40 has a dual-duct blower 47 for drawing in fresh air from the environment and/or recirculated air from the passenger compartment, and an air directing element embodied as an air damper 53.

The blower draws in fresh air in the direction of flow 43 through a fresh air intake 41, and draws in recirculated air in the direction of flow 44 through a recirculated air intake 42. The cross-sections of fresh air intake 41 and recirculated air intake 42 are each closed or opened by an air damper 45, 46. In the region of blower 47, fresh air intake 41 and recirculated air intake 42, which are otherwise embodied as fluidically separate from one another, can be connected to one another by means of an air damper 48. Air dampers 45, 46, 48 are each embodied as movably adjustable between the two end positions of open and closed.

Depending on the positions of air dampers 45, 46, 48, fresh air, recirculated air, or a mixture of fresh air and recirculated air is supplied to the individual impellers of the dual-duct blower 47. The first impeller of blower 47 thereby conveys an air mass flow into a first flow path 50, whereas the second impeller of blower 47 conveys an air mass flow into a second flow path 51. The flow paths 50, 51, formed within a diffuser, are fluidically separated from one another by a partition 52. The diffuser serves as a connecting element between air duct assembly 40 and housing 2c.

In the region of an air directing element 53 which is movably adjustable between two end positions, partition 52 has an opening. In a first end position of air directing element 53 embodied as an air damper, according to FIG. 8B, air directing element 53 is aligned with partition 52. The air directing element 53, also referred to as a diffuser damper due to its positioning, and the opening are closed. Bypass flow path 32c is open. The air mass flows conducted through the diffuser are separated such that the air mass flow conveyed by the first impeller of blower 47 is conducted exclusively into bypass flow path 32c and the air mass flow conveyed by the second impeller of blower 47 is fed exclusively to evaporator 21.

In a second end position of air directing element 53, according to FIG. 8A, air directing element 53 abuts against an outer wall of the air duct assembly 40 such that the opening of partition 52 and air directing element 53 and are open and bypass flow path 32c is closed. The air mass flows conveyed by the impellers of blower 47 are fed to evaporator 21 as a total air mass flow.

When air directing element 53 is in an intermediate position between the two end positions, the air mass flow conveyed by the first impeller of blower 47 is conducted proportionally to bypass flow path 32c and, along with the air mass flow conveyed by the second impeller of blower 47, to evaporator 21.

Air duct assembly 40 is designed as comprising fresh air intake 41, recirculated air intake 42, the associated air dampers 45, 46, 48, the impellers of blower 47, and flow paths 50, 51, such that the fresh air is conducted through first flow path 50, preferably to bypass flow path 32c, whereas the recirculated air is fed through second flow path 51, preferably to evaporator 21. In this case, both the air dampers 45, 46, 48 and the air directing element 53, which is formed in partition 52, are closed.

The position of air damper 48 enables an air mass flow, for example fresh or recirculated air, to be fed to both impellers of blower 47, while at the same time one intake 41, 42 is closed.

The impellers of blower 47 may alternatively be embodied as fixedly coupled to one another or as controllable separately from one another. The separately controllable impellers of blower 47 produce beneficial dynamics in air conditioning system 1c, since the first flow path 50, for example in the intake to heating heat exchanger 23, and the second flow path 51 to evaporator 21 can be charged with air mass flows of different speeds, thus enabling a rapid response to altered operating conditions.

Figure 9A:
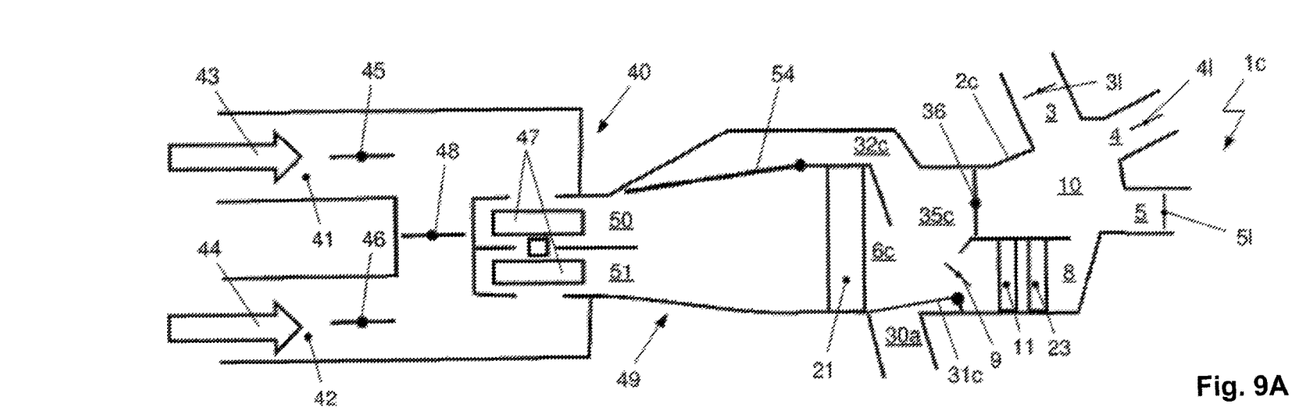
FIGS. 9A, 9B: in accordance with FIGS. 5A, 5B and having an air duct assembly arranged upstream in the direction of air flow, with a dual-duct blower for drawing in fresh air and/or recirculated air, and an air directing element embodied as a hinged wall element.
Figure 9B:
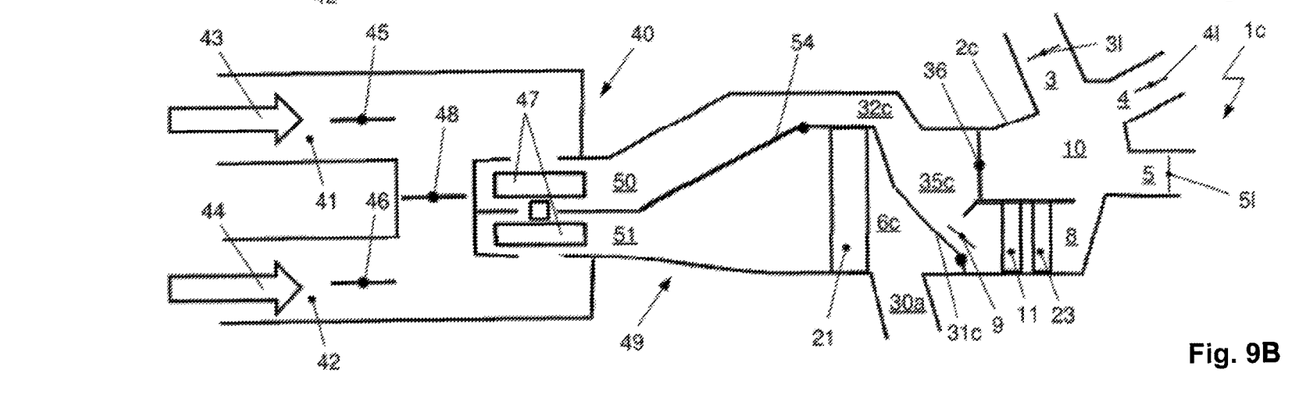

FIGS. 9A and 9B show air conditioning system 1c with air duct assembly 40, similar to that of FIGS. 8A and 8B. The difference between the systems consists in the design of partition 52 with the air directing element 53 embodied as a compact air damper according to FIGS. 8A and 8B, as compared with air directing element 54 embodied as a hinged wall element, according to FIGS. 9A and 9B. In the latter case, air directing element 54 replaces the entire partition 52 provided with air directing element 53. For an explanation of the individual functions of air directing element 54, reference is made to the description of FIGS. 8A and 8B.

Figure 10:
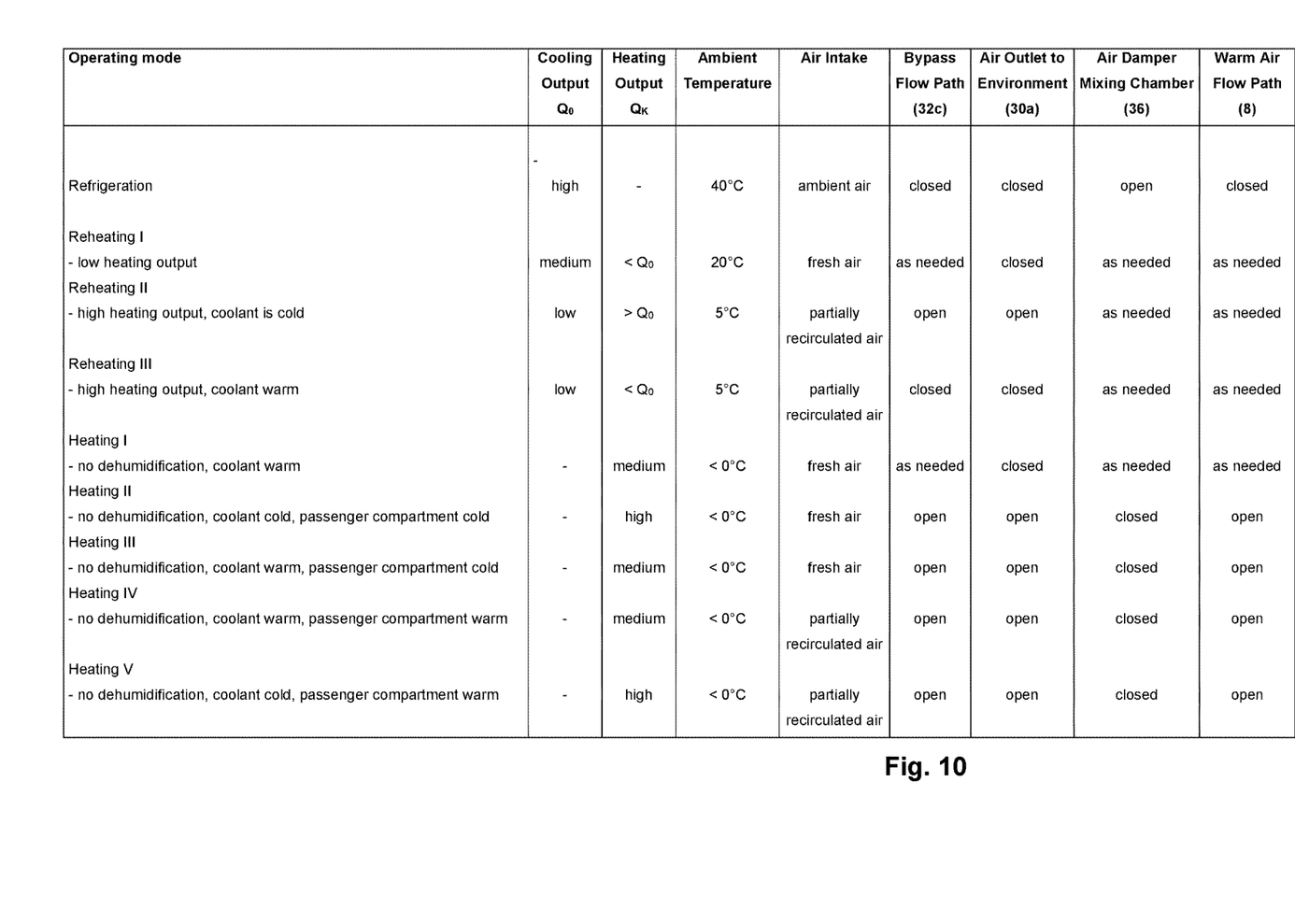
FIG. 10: a table listing operating modes of the air conditioning system.

Depending on the environmental conditions, when air conditioning system 1c according to FIGS. 8A, 8B, 9A, 9B is in operation, different positions of air dampers 36, 45, 46 and air directing elements 31c, 53, 54 are used to achieve maximum efficiency in air conditioning the passenger compartment, particularly during operation in reheating mode. In this process, various combinations of the supply of air to the impellers of blower 47, through bypass flow path 32c and to evaporator 21 and the flow out of housing 2c are adjusted. The main modes of operation are listed in the table shown in FIG. 10.

LIST OF REFERENCE NUMERALS

1', 1a, 1b, 1c, 1d, 1e air conditioning system
2', 2a, 2b, 2c, 2d, 2e housing
3, 4, 5 air outlet to passenger compartment 3*l*, 4*l*, 5*l* air damper air outlet to passenger compartment 3, 4, 5
6', 6*a*, 6*b*, 6*c*, 6*e* cold air flow path
7 air damper cold air flow path
8 warm air flow path
9 air damper warm air flow path
10 first mixing chamber
11 first heating heat exchanger
20 refrigerant circuit
21 heat exchanger, evaporator
22 compressor
23' second heating heat exchanger
23 heat exchanger, second heating heat exchanger, first condenser/gas cooler
24 heat exchanger, second condenser/gas cooler
25 air damper for heat exchanger 24
26 expansion element
30*a*, 30*b* air outlet to environment
31*l* air damper for air outlet to environment 30*a*, 30*b*
31*c* air directing element for air outlet to environment 30*a*
32*c*, 32*e* bypass flow path
33*c* air damper for bypass flow path 32*c*
34 air directing element for bypass flow path 32*e*
35*c*, 35*e* second mixing chamber
36 air damper for mixing chamber
37 air directing element
40 air duct assembly
41 fresh air intake, intake
42 recirculated air intake, intake
43 direction of flow of fresh air
44 direction of flow of recirculated air
45 air damper for fresh air intake 41
46 air damper for recirculated air intake 42
47 dual-duct blower
48 air damper for intake to impeller 47
49 diffuser
50 first flow path
51 second flow path
52 partition between flow paths 50, 51
53 air directing element
54 air directing element

What is claimed is:

1. An air conditioning system for conditioning air in a passenger compartment of a motor vehicle, wherein the air conditioning system is designed to operate in a refrigeration mode for cooling, in a heat pump mode for heating, and in a reheating mode, and wherein an operating mode is adjusted by controlling air dampers and air directing elements, the air conditioning system comprising:
    a housing having a cold air flow path and a warm air flow path for conducting air, and an air outlet formed in a region of cold air flow path for discharging the air into an environment surrounding the air conditioning system, the warm air flow path branching off from the cold air flow path, only the cold air flow path and the warm air flow path leading into a first mixing chamber, a cross-section of the cold air flow path being closed or opened by one of the air dampers and a cross-section of the warm air flow path being closed or opened by another one of the air dampers; and
    a refrigerant circuit having a heat exchanger operating as an evaporator, a compressor, a heat exchanger operating as a first condenser/gas cooler, a heat exchanger operating as a second condenser/gas cooler, and an expansion element, the heat exchanger operating as the evaporator positioned within the cold air flow path, the heat exchanger operating as the first condenser/gas cooler positioned as a heating heat exchanger within the warm air flow path, and the heat exchanger operating as the second condenser/gas cooler positioned outside of the housing, wherein the air outlet and the warm air flow path are formed as branching off from the cold air flow path downstream in a direction of air flow of the heat exchanger operating as the evaporator.

2. The air conditioning system according to claim 1, wherein the air dampers and the air directing elements are adjustable and arranged such that an air mass flow conducted over a heat transfer surface of the heat exchanger operating as the evaporator is conducted directly through the air outlet into the environment.

3. The air conditioning system according to claim 1, wherein the heat exchanger operating as the first condenser/gas cooler and the heat exchanger operating as the second condenser/gas cooler are arranged sequentially within the refrigerant circuit in a direction of flow of a refrigerant.

4. The air conditioning system according to claim 1, wherein the heat exchanger operating as the second condenser/gas cooler is positioned such that it can be supplied with ambient air, with ambient air dampers for adjusting an air mass flow of the ambient air arranged upstream of the heat exchanger operating as the second condenser/gas cooler in a direction of flow of the ambient air.

5. The air conditioning system according to claim 1, wherein the housing includes a bypass flow path around the heat exchanger operating as the evaporator, the bypass flow path closed and opened by one of the air dampers or the air directing elements which is movably adjustable.

6. The air conditioning system according to claim 5, wherein the bypass flow path and the cold air flow path lead into a second mixing chamber.

7. The air conditioning system according to claim 6, wherein the air dampers and the air directing elements are adjustable and arranged such that an air mass flow conducted through the bypass flow path is conducted directly into the warm air flow path.

8. The air conditioning system according to claim 7, wherein one of the air directing elements is adjustable between two end positions, wherein in a first one of the end positions of the one of the air directing elements the air outlet is closed and the cold air flow path toward the second mixing chamber and the warm air flow path is open, and in a second one of the end positions of the one of the air directing elements, the air outlet is open and the cold air flow path toward the second mixing chamber and the warm air flow path is closed.

9. The air conditioning system according to claim 1, further comprising an additional heating heat exchanger within the warm air flow path in addition to the heat exchanger operating as the first condenser/gas cooler of the refrigerant circuit, the additional heating heat exchanger and the heat exchanger operating as the first condenser/gas cooler arranged sequentially in a direction of flow of an air mass flow through the warm air flow path.

10. The air conditioning system according to claim 9, wherein the additional heating heat exchanger is a component of a coolant circuit, and wherein the additional heating heat exchanger is arranged upstream of the heat exchanger operating as the first condenser/gas cooler in the direction of flow of the air mass flow through the warm air flow path.

11. The air conditioning system according to claim 5, the air conditioning system further comprising:
    an air duct assembly arranged upstream in the direction of air flow selectively supplying an air mass flow to the cold air flow path and an air mass flow to the bypass flow path of the housing, the air duct assembly further comprising:
- a blower drawing in at least one of fresh air from the environment and recirculated air from the passenger compartment;
- a fresh air intake and a recirculated air intake, each of the fresh air intake and the recirculated air intake having an air damper opening and closing cross-sections of the fresh air intake and the recirculated air intake; and
- a diffuser having at least two flow paths fluidically separated from one another, wherein the blower includes a dual-duct with two impellers, a first one of the impellers conveying a first air mass flow through a first one of the at least two flow paths and a second one of the impellers conveying a second air mass flow through a second one of the at least two flow paths, wherein the diffuser of the air duct assembly is formed as a connecting element to the housing, and wherein the first one of the at least two flow paths leads into the bypass flow path and the second one of the at least two flow paths leads into the cold air flow path.

12. The air conditioning system according to claim 11, wherein the at least two flow paths formed within the diffuser can be fluidically connected to one another by an opening formed between the at least two flow paths, the opening closed and opened by an air directing element, wherein the air directing element is adjustable between two end positions, and wherein
- in a first one of the two end positions of the air directing element, the opening formed between the at least two flow paths is closed and the at least two flow paths are open, and
- in a second one of the two end positions of the air directing element, the opening formed between the at least two flow paths is open and the first one of the at least two flow paths is closed.

13. The air conditioning system according to claim 1, wherein the one of the air dampers closing or opening the cross-section of the cold air flow path is located at an intake of the cold air flow path and the another one of the air dampers closing or opening the cross-section of the warm air flow path is located at an intake of the warm air flow path.

* * * * *